United States Patent
Iannce et al.

(10) Patent No.: US 10,560,329 B2
(45) Date of Patent: Feb. 11, 2020

(54) AUTO-COMMISSIONING OF ELECTRICAL DEVICES

(71) Applicant: Cooper Technologies Company, Houston, TX (US)

(72) Inventors: Stephan P Iannce, Clay, NY (US); Benjamin Avery Freer, Syracuse, NY (US); Joseph Michael Manahan, Manlius, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 39 days.

(21) Appl. No.: 15/657,901

(22) Filed: Jul. 24, 2017

(65) Prior Publication Data

US 2018/0026845 A1   Jan. 25, 2018

Related U.S. Application Data

(60) Provisional application No. 62/366,193, filed on Jul. 25, 2016.

(51) Int. Cl.
*H04L 12/24* (2006.01)
*H04W 84/12* (2009.01)

(52) U.S. Cl.
CPC ......... *H04L 41/0886* (2013.01); *H04W 84/12* (2013.01)

(58) Field of Classification Search
None
See application file for complete search history.

(56) References Cited

U.S. PATENT DOCUMENTS

| 5,371,897 | A | * | 12/1994 | Brown | H04L 29/00 709/222 |
|---|---|---|---|---|---|
| 8,745,704 | B2 | * | 6/2014 | Bennett | H04B 3/54 370/310 |
| 2004/0264463 | A1 | * | 12/2004 | Fukushima | H04L 12/184 370/390 |
| 2006/0015621 | A1 | * | 1/2006 | Quinn | H04W 88/06 709/227 |
| 2006/0185818 | A1 | * | 8/2006 | Garozzo | F24F 11/30 165/11.1 |
| 2007/0105542 | A1 | * | 5/2007 | Friedman | H04W 4/00 455/420 |
| 2008/0252469 | A1 | * | 10/2008 | Perten | H04Q 9/00 340/585 |

(Continued)

OTHER PUBLICATIONS

A. Tokarev, International Search Report and Written Opinion issued in application PCT/US2017/043503, completion date Sep. 25, 2017, dated Oct. 12, 2017, 7 pages, Federal Institute of Industrial Property, Moscow, Russia.

*Primary Examiner* — Ayaz R Sheikh
*Assistant Examiner* — Tarell A Hampton
(74) *Attorney, Agent, or Firm* — King & Spalding LLP (57) ABSTRACT

An electrical device of a network of electrical devices can include an auto-commissioning device having a transceiver and an auto-commissioning engine, where the transceiver communicates with an adjacent transceiver of an adjacent electrical device, where the auto-commissioning engine, based on communication between the transceiver and the adjacent transceiver, identifies and commissions the adjacent electrical device.

16 Claims, 4 Drawing Sheets

(56) References Cited

U.S. PATENT DOCUMENTS

| | | | |
|---|---|---|---|
| 2010/0083356 A1* | 4/2010 | Steckley | H04L 12/2818 726/5 |
| 2010/0145479 A1* | 6/2010 | Griffiths | G01D 21/00 700/17 |
| 2010/0273519 A1* | 10/2010 | Yen | H04W 52/0274 455/522 |
| 2012/0066707 A1* | 3/2012 | Poder | G08B 25/008 725/14 |
| 2012/0127914 A1* | 5/2012 | Tan | H04B 7/15592 370/315 |
| 2013/0244681 A1* | 9/2013 | Ookubo | H04W 72/082 455/452.1 |
| 2013/0271290 A1 | 10/2013 | Saenz et al. | |
| 2015/0364033 A1 | 12/2015 | Witkowski et al. | |
| 2017/0041886 A1* | 2/2017 | Baker | H04W 76/14 |
| 2017/0184343 A1* | 6/2017 | Freer | F25D 11/003 |

* cited by examiner

AUTO-COMMISSIONING OF ELECTRICAL DEVICES

CROSS-REFERENCE TO RELATED APPLICATIONS

This application claims priority under 35 U.S.C. § 119 to U.S. Provisional Patent Application Ser. No. 62/366,193, titled "Auto-Commissioning of Electrical Devices" and filed on Jul. 25, 2016, the entire contents of which are hereby incorporated herein by reference.

TECHNICAL FIELD

The present disclosure relates generally to commissioning electrical devices, and more particularly to systems, methods, and devices for auto-commissioning of multiple similar electrical devices.

BACKGROUND

Commissioning of equipment is a time-consuming but necessary process that must be completed to account for each device and to test each device before putting that device in service.

SUMMARY

In general, in one aspect, the disclosure relates to an electrical device of a network of electrical devices. The electrical device can include an auto-commissioning device having a transceiver and an auto-commissioning engine, where the transceiver communicates with an adjacent transceiver of an adjacent electrical device, where the auto-commissioning engine, based on communication between the transceiver and the adjacent transceiver, identifies and commissions the adjacent electrical device.

In another aspect, the disclosure can generally relate to a system. The system can include a first electrical device having a first auto-commissioning system, where the first auto-commissioning system includes a first transceiver. The system can also include a second electrical device having a second auto-commissioning system, where the second auto-commissioning system includes a second transceiver. The second transceiver can broadcast a first communication, where the first communication includes a first identification of the second electrical device. The first transceiver of the first electrical device can receive the first communication. The first transceiver, in response to the first communication, can broadcast a first reply communication, where the first reply communication comprises commissioning parameters and the first identification of the second electrical device. The second electrical device can use the first reply communication to become commissioned.

In yet another aspect, the disclosure can generally relate to a method for commissioning a plurality of electrical devices. The method can include receiving commissioning parameters. The method can also include receiving a first communication from a first electrical device, where the first communication includes a first identification of the first electrical device, and where the first electrical device is in a first mode. The method can further include sending, in response to the first communication, a first reply communication to the first electrical device, where the first reply communication includes the first identification of the first electrical device and the commissioning parameters. The first electrical device can be commissioned according to the commissioning parameters. The first electrical device can exit the first mode and enter a second mode after processing the first reply communication.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

The example embodiments discussed herein are directed to systems, methods, and devices for auto-commissioning of electrical devices, and in particular to auto-commissioning of reefer receptacles. While example embodiments are directed to reefer receptacles, example embodiments can also be used with other electrical devices that are enabled and capable of communicating with one another. Examples of such other electrical devices can include, or be part of, but are not limited to, reefer receptacles, reefer containers, protective relays, motor control centers, panel boards, light fixtures, and controllers. A reefer receptacle is used to provide power to a refrigerated cargo container, which is also called a reefer container.

Also, while example embodiments are described as being used with reefer receptacles, example embodiments can be used with any type of electrical receptacles and/or electrical connector. Therefore, the term "reefer receptacle" can be viewed as any type of electrical receptacles and/or electrical connector. In general, example embodiments provide systems, methods, and devices for auto-commissioning of reefer receptacles. The example embodiments of auto-commissioning of reefer receptacles provide a number of benefits. Such benefits can include, but are not limited to, reduced costs and resources for commissioning activities, more effective and thorough commissioning, and compliance with industry standards that apply to reefer receptacles and reefer containers.

The example reefer receptacles capable of auto-commissioning (or components thereof) described herein can be made of one or more of a number of suitable materials. Examples of such materials can include, but are not limited to, aluminum, stainless steel, fiberglass, glass, plastic, ceramic, and rubber. Further, such reefer receptacles and/or other associated components of a related system can meet certain standards and/or regulations. Example embodiments are designed to be used in any of a number of environments. Such environments can include, but are not limited to, hazardous environments, high humidity environments, marine environments, chemical environments, environments with heavy equipment, extreme temperature environments, climate-controlled environments, outdoor environments, and corrosive environments.

In the foregoing figures showing example embodiments of auto-commissioning of reefer receptacles, one or more of the components shown may be omitted, repeated, and/or substituted. Accordingly, example embodiments of auto-commissioning of reefer receptacles should not be considered limited to the specific arrangements of components shown in any of the figures. For example, features shown in one or more figures or described with respect to one embodiment can be applied to another embodiment associated with a different figure or description.

In certain example embodiments, reefer receptacles for which example embodiments are used are subject to meeting certain standards and/or requirements. For example, the National Electric Code (NEC), the National Electrical Manufacturers Association (NEMA), the International Electrotechnical Commission (IEC), and the Institute of Electrical and Electronics Engineers (IEEE) set standards as to electrical enclosures, wiring, and electrical connections. Use of example embodiments described herein meet (and/or allow a corresponding device and/or electrical enclosure to meet) such standards when required. In some (e.g., reefer receptacles) applications, additional standards particular to that application may be met by the devices in which auto-commissioning of reefer receptacles are used.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of auto-commissioning of reefer receptacles will be described more fully hereinafter with reference to the accompanying drawings, in which example embodiments of auto-commissioning of reefer receptacles are shown. Auto-commissioning of reefer receptacles may, however, be embodied in many different forms and should not be construed as limited to the example embodiments set forth herein. Rather, these example embodiments are provided so that this disclosure will be thorough and complete, and will fully convey the scope of auto-commissioning of reefer receptacles to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of auto-commissioning of reefer receptacles. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
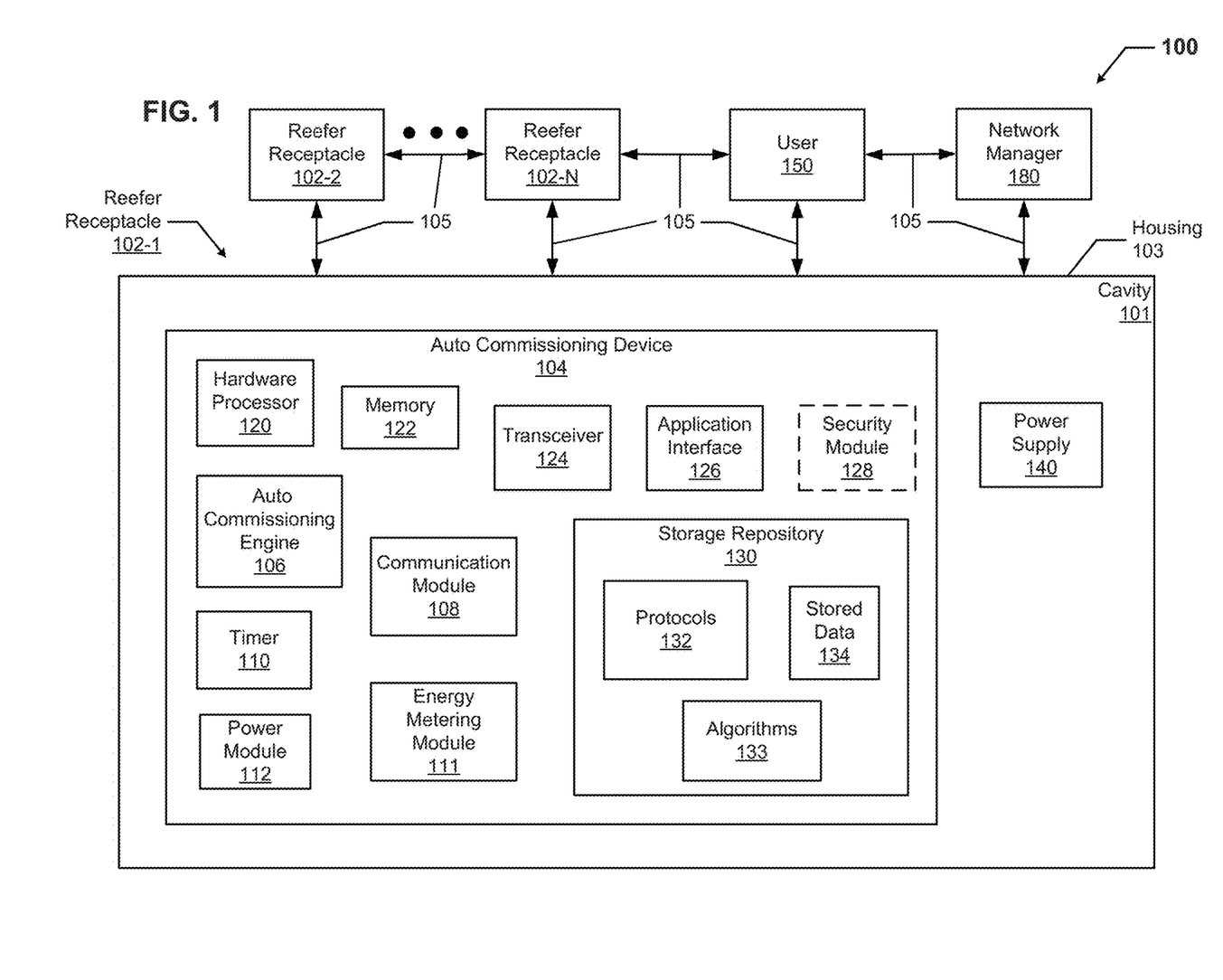
FIG. 1 shows a system diagram that includes a number of electrical devices in accordance with certain example embodiments.

FIG. 1 shows a system diagram of an auto-commissioning system 100 that includes an auto-commissioning device 104 of a reefer receptacle 102-1 in accordance with certain example embodiments. The auto-commissioning system 100 can also include a user 150, a network manager 180, and at least one other reefer receptacle 102 (e.g., reefer receptacle 102-2, reefer receptacle 102-N). In addition to the auto-commissioning device 104, the reefer receptacle 102-1 can include one or more of a number of other components, including but not limited to a power supply 140.

The auto-commissioning device 104 can include one or more of a number of components. Such components, can include, but are not limited to, an auto-commissioning engine 106, a communication module 108, a timer 110, an energy metering module 111, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example reefer receptacle. Any component of the example reefer receptacle 102-1 can be discrete or combined with one or more other components of the reefer receptacle 102-1.

A user 150 may be any person that interacts with reefer receptacles 102 and/or reefer containers. Examples of a user 150 may include, but are not limited to, an engineer, an electrician, a deckhand, a crane operator, an instrumentation and controls technician, an instrumentation and controls technician, a mechanic, an operator, a consultant, an inventory management system, an inventory manager, a foreman, a labor scheduling system, a contractor, and a manufacturer's representative. The user 150 can use a user system (not shown), which may include a display (e.g., a GUI). The user 150 interacts with (e.g., sends data to, receives data from) the auto-commissioning device 104 of the reefer receptacle 102-1 via the application interface 126 (described below). The user 150 can also interact with a network manager 180 and/or any of the other reefer receptacles 102 (e.g., reefer receptacle 102-2, reefer receptacle 102-N) in the system 100.

Interaction between the user 150 and the reefer receptacles 102 (or components thereof, such as the auto-commissioning device 104) and/or the network manager 180 is conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, WirelessHART, ISA100) technology. For example, a communication link 105 can be (or include) one or more electrical conductors that are coupled to the housing 103 of a reefer receptacle 102. The communication link 105 can transmit signals (e.g., power signals, communication signals, control signals, data) between one or more reefer receptacles 102 and the user 150 and/or the network manager 180.

The network manager 180 is a device or component that controls all or a portion of a communication network that includes the auto-commissioning device 104 of the reefer receptacle 102-1 and the additional reefer receptacles 102 (including components thereof) that are communicably coupled to the auto-commissioning device 104. The network manager 180 can be substantially similar to the auto-commissioning device 104. Alternatively, the network manager 180 can include one or more of a number of features in addition to, or altered from, the features of the auto-commissioning device 104 described below. As described herein, communication with the network manager 180 can include communicating with one or more other components (e.g., another reefer receptacle 102) of the system 100. In such a case, the network manager 180 can facilitate such communication.

The user 150, the network manager 180, and/or the other reefer receptacles 102 can interact with the auto-commissioning device 104 of the reefer receptacle 102-1 using the application interface 126 in accordance with one or more example embodiments. Specifically, the application interface 126 of the auto-commissioning device 104 receives data (e.g., information, communications, instructions, updates to firmware) from and sends data (e.g., information, communications, instructions) to the user 150, the network manager 180, and/or each other reefer receptacle 102. The user 150, the network manager 180, and/or each other reefer receptacle 102 can include an interface to receive data from and send data to the auto-commissioning device 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The auto-commissioning device 104, the user 150, the network manager 180, and/or the other reefer receptacles 102 can use their own system or share a system in certain example embodiments. Such a system can be, or contain a form of, an Internet-based or an intranet-based computer system that is capable of communicating with various software. A computer system includes any type of computing device and/or communication device, including but not limited to the auto-commissioning device 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, auto-commissioning system software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100. The reefer receptacle 102-1 can include a housing 103. The housing 103 can include at least one wall that forms a cavity 101. In some cases, the housing 103 can be designed to comply with any applicable standards so that the reefer receptacle 102-1 can be located in a particular environment (e.g., a hazardous environment, a harsh environment).

The housing 103 of the reefer receptacle 102-1 can be used to house one or more components of the reefer receptacle 102-1, including one or more components of the auto-commissioning device 104. For example, as shown in FIG. 1, the auto-commissioning device 104 (which in this case includes the auto-commissioning engine 106, the communication module 108, the timer 110, the energy metering module 111, the power module 112, the storage repository 130, the hardware processor 120, the memory 122, the transceiver 124, the application interface 126, and the optional security module 128) and the power supply 140 are disposed in the cavity 101 formed by the housing 103. In alternative embodiments, any one or more of these or other components of the reefer receptacle 102-1 can be disposed on the housing 103 and/or remotely from the housing 103.

The storage repository 130 can be a persistent storage device (or set of devices) that stores software and data used to assist the auto-commissioning device 104 in communicating with the user 150, the network manager 180, and one or more other reefer receptacles 102 within the system 100. In one or more example embodiments, the storage repository 130 stores one or more protocols 132, algorithms 133, and stored data 134. The protocols 132 can include any of a number of communication protocols that are used to send and/or receive data between the auto-commissioning device 104 and the user 150, the network manager 180, and one or more other reefer receptacles 102. A protocol 132 can also include one or more processes for auto-commissioning one or more reefer receptacles 102 in the system 100. One or more of the protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 can provide a layer of security to the data transferred within the system 100.

The algorithms 133 can be any procedures (e.g., a series of method steps), formulas, logic steps, mathematical models, and/or other similar operational procedures that the auto-commissioning engine 106 of the auto-commissioning device 104 follows based on certain conditions at a point in time. An example of an algorithm 133 is identifying one or more of the other reefer receptacles 102, determining (e.g., using an algorithm 133) whether the other identified reefer receptacles 102 are operating properly, and storing (e.g., using the stored data 134 in the storage repository 130) the data.

Algorithms 133 can be focused on commissioning (e.g., confirming identification and operation) of the reefer receptacle 102-1 and the other reefer receptacles 102 in the system 100. An algorithm 133 can be fixed or modified (e.g., by a user 150, by the auto-commissioning engine 106) over time. Modification of an algorithm 133 can be based on one or more of a number of factors, including but not limited to new equipment (e.g., a new transceiver 124) and correction based on actual data.

Stored data 134 can be any data (e.g., processing speed) associated with the reefer receptacle 102-1 (including other reefer receptacles 102 and/or any components thereof), measurements taken by the energy metering module 111, threshold values, commissioning parameters, reefer identification numbers, results of previously run or calculated algorithms, and/or any other suitable data. Such data can be any type of data, including but not limited to historical data for the reefer receptacle 102-1, historical data for other reefer receptacles 102, calculations, an identification number of a reefer receptacle 102, and measurements taken by the energy metering module 111. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the auto-commissioning engine 106. In one or more example embodiments, the auto-commissioning engine 106 includes functionality to communicate with the user 150, and the network manager 180 in the system 100. More specifically, the auto-commissioning engine 106 sends information to and/or receives information from the storage repository 130 in order to communicate with the user 150, the network manager 180, and the reefer receptacles 102. As discussed below, the storage repository 130 can also be operatively connected to the communication module 108 in certain example embodiments.

In certain example embodiments, the auto-commissioning engine 106 of the auto-commissioning device 104 controls the operation of one or more components (e.g., the communication module 108, the timer 110, the transceiver 124) of the auto-commissioning device 104. For example, the auto-commissioning engine 106 can activate the communication module 108 when the communication module 108 is in "sleep" mode and when the communication module 108 is needed to send data received from another component (e.g., another reefer receptacle 102, the user 150) in the system 100.

As another example, the auto-commissioning engine 106 can acquire the current time using the timer 110. The real time clock 110 can enable the auto-commissioning device 104 to control the reefer receptacle 102-1 even when the auto-commissioning device 104 has no communication with the network manager 180. As yet another example, the auto-commissioning engine 106 can direct the energy metering module 111 to measure and send power consumption information of the reefer receptacle 102-1 to the network manager 180.

The auto-commissioning engine 106 can be configured to perform a number of functions that help commission the reefer receptacle 102-1 (or components thereof) and, in some cases, one or more other reefer receptacles 102 in the system 100. For example, the auto-commissioning engine 106 can send commissioning parameters (a form of stored data 134) to another reefer receptacle 102 in the system 100 so that other reefer receptacle 102 can be auto-commissioned using those commissioning parameters. As another example, the auto-commissioning engine 106 can determine the mode (e.g., access point mode, commissioning mode, normal operating mode) in which the reefer receptacle 102-1 operates. As discussed above, the auto-commissioning engine 106 can execute any of the algorithms 133 stored in the storage repository 130. In certain example embodiments, the auto-commissioning engine 106 controls the frequency at which a signal is sent to another reefer receptacle 102 in the system 100.

The auto-commissioning engine 106 can provide control, communication, and/or other similar signals to the user 150, the network manager 180, and one or more of the reefer receptacles 102. Similarly, the auto-commissioning engine 106 can receive control, communication, and/or other similar signals from the user 150, the network manager 180, and one or more of the reefer receptacles 102. The auto-commissioning engine 106 may include a printed circuit board, upon which the hardware processor 120 and/or one or more discrete components of the auto-commissioning device 104 are positioned.

In certain embodiments, the auto-commissioning engine 106 of the auto-commissioning device 104 can communicate with one or more components of a system external to the system 100 in furtherance of commissioning the reefer receptacle 102-1 and, in some cases, one or more other reefer receptacles 102 in the system 100. For example, the auto-commissioning engine 106 can interact with an inventory management system by ordering a replacement part for a reefer receptacle 102 that the auto-commissioning engine 106 has determined to fail or be failing. As another example, the auto-commissioning engine 106 can interact with a workforce scheduling system by scheduling a maintenance crew to repair or replace the reefer receptacle 102-1 (or portion thereof) when the auto-commissioning engine 106 determines that the reefer receptacle 102-1 or portion thereof requires maintenance or replacement. In this way, the auto-commissioning device 104 is capable of performing a number of functions beyond what could reasonably be considered a routine task.

In certain example embodiments, the auto-commissioning engine 106 can include an interface that enables the auto-commissioning engine 106 to communicate with one or more components (e.g., power supply 140) of the reefer receptacle 102-1. For example, if the power supply 140 of the reefer receptacle 102-1 operates under IEC Standard 62386, then the power supply 140 can have a serial communication interface that will transfer data (e.g., stored data 134). In such a case, the auto-commissioning engine 106 can also include a serial interface to enable communication with the power supply 140 within the reefer receptacle 102-1. Such an interface can operate in conjunction with, or independently of, the protocols 132 used to communicate between the auto-commissioning device 104 and the user 150, the network manager 180, and the other reefer receptacles 102.

The auto-commissioning engine 106 (or other components of the auto-commissioning device 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 108 of the auto-commissioning device 104 determines and implements the communication protocol (e.g., from the protocols 132 of the storage repository 130) that is used when the auto-commissioning engine 106 communicates with (e.g., sends signals to, receives signals from) the user 150, the network manager 180, and/or one or more of the other reefer receptacles 102. In some cases, the communication module 108 accesses the stored data 134 to determine which communication protocol is used to communicate with the other reefer receptacle 102 associated with the stored data 134. In addition, the communication module 108 can interpret the communication protocol of a communication received by the auto-commissioning device 104 so that the auto-commissioning engine 106 can interpret the communication.

The communication module 108 can send and receive data between the network manager 180, the other reefer receptacles 102, and/or the users 150 and the auto-commissioning device 104. The communication module 108 can send and/or receive data in a given format that follows a particular protocol 132. The auto-commissioning engine 106 can interpret the data packet received from the communication module 108 using the protocol 132 information stored in the storage repository 130. The auto-commissioning engine 106 can also facilitate the data transfer between the network manager 180, the other reefer receptacles 102, and/or a user 150 by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the auto-commissioning engine 106 can facilitate the transfer of data between the communication module 108 and the storage repository 130. The communication module 108 can also provide encryption to data that is sent by the auto-commissioning device 104 and decryption to data that is received by the auto-commissioning device 104. The communication module 108 can also provide one or more of a number of other services with respect to data sent from and received by the auto-commissioning device 104. Such services can include, but are not limited to, data packet routing information and procedures to follow in the event of data interruption.

The timer 110 of the auto-commissioning device 104 can track clock time, intervals of time, an amount of time, and/or any other measure of time. The timer 110 can also count the number of occurrences of an event, whether with or without respect to time. Alternatively, the auto-commissioning engine 106 can perform the counting function. The timer 110 is able to track multiple time measurements concurrently. The timer 110 can track time periods based on an instruction received from the auto-commissioning engine 106, based on an instruction received from the user 150, based on an instruction programmed in the software for the auto-commissioning device 104, based on some other condition or from some other component, or from any combination thereof.

The timer 110 can be configured to track time when there is no power delivered to the auto-commissioning device 104 (e.g., the power module 112 malfunctions) using, for example, a super capacitor or a battery backup. In such a case, when there is a resumption of power delivery to the auto-commissioning device 104, the timer 110 can communicate any aspect of time to the auto-commissioning device 104. In such a case, the timer 110 can include one or more of a number of components (e.g., a super capacitor, an integrated circuit) to perform these functions.

The energy metering module 111 of the auto-commissioning device 104 measures one or more components of power (e.g., current, voltage, resistance, VARs, watts) associated with the reefer receptacle 102-1 at one or more points. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor.

The power module 112 of the auto-commissioning device 104 provides power to one or more other components (e.g., timer 110, auto-commissioning engine 106) of the auto-commissioning device 104. In addition, in certain example embodiments, the power module 112 can provide power to the power supply 140 of the reefer receptacle 102-1. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112, Alternatively, the auto-commissioning device 104 can include a power metering module (not shown) to measure one or more elements of power that flows into, out of, and/or within the auto-commissioning device 104.

The power module 112 can include one or more components (e.g., a transformer, a diode bridge, an inverter, a converter) that receives power (for example, through an electrical cable) from a source external to the reefer receptacle 102-1 and generates power of a type (e.g., alternating current, direct current) and level (e.g., 12V, 24V, 120V) that can be used by the other components of the auto-commissioning device 104 and/or by the power supply 140. The power module 112 can use a closed control loop to maintain a preconfigured voltage or current with a tight tolerance at the output. The power module 112 can also protect the rest of the electronics (e.g., hardware processor 120, transceiver 124) in the reefer receptacle 102-1 from surges generated in the line.

In addition, or in the alternative, the power module 112 can be a source of power in itself to provide signals to the other components of the auto-commissioning device 104 and/or the power supply 140. For example, the power module 112 can be a battery. As another example, the power module 112 can be a localized photovoltaic power system.

The hardware processor 120 of the auto-commissioning device 104 executes software, algorithms, and firmware in accordance with one or more example embodiments. Specifically, the hardware processor 120 can execute software on the auto-commissioning engine 106 or any other portion of the auto-commissioning device 104, as well as software used by the user 150, the network manager 180, and/or one or more other reefer receptacles 102. The hardware processor 120 can be an integrated circuit, a central processing unit, a multi-core processing chip, SoC, a multi-chip module including multiple multi-core processing chips, or other hardware processor in one or more example embodiments.

The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the auto-commissioning device 104 relative to the hardware processor 120 according to some example embodiments. In certain configurations, the memory 122 can be integrated with the hardware processor 120.

In certain example embodiments, the auto-commissioning device 104 does not include a hardware processor 120. In such a case, the auto-commissioning device 104 can include, as an example, one or more field programmable gate arrays (FPGA), one or more integrated-gate bipolar transistors (IGBTs), and/or one or more integrated circuits (ICs). Using FPGAs, IGBTs, ICs, and/or other similar devices known in the art allows the auto-commissioning device 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the auto-commissioning device 104 can send and/or receive control and/or communication signals. Specifically, the transceiver 124 can be used to transfer data between the auto-commissioning device 104 and the user 150, the network manager 180, and/or one or more other reefer receptacles 102. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, and/or one or more other reefer receptacles 102. The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Such communication protocols can be stored in the protocols 132 of the storage repository 130. Further, any transceiver information for the user 150, and/or the network manager 180 can be part of the stored data 134 (or similar areas) of the storage repository 130.

Optionally, in one or more example embodiments, the security module 128 secures interactions between the auto-commissioning device 104, the user 150, and/or the network manager 180. More specifically, the security module 128 authenticates communication from software based on security keys verifying the identity of the source of the communication. For example, user software may be associated with a security key enabling the software of the user 150 to interact with the auto-commissioning device 104. Further, the security module 128 can restrict receipt of information, requests for information, and/or access to information in some example embodiments.

The power supply 140 of the reefer receptacle 102-1 provides power to one or more components of the reefer receptacle 102-1. The power supply 140 can be substantially the same as, or different than, the power module 112 of the auto-commissioning device 104. The power supply 140 can include one or more of a number of single or multiple discrete components (e.g., transistor, diode, resistor), and/or a microprocessor. The power supply 140 may include a printed circuit board upon which the microprocessor and/or one or more discrete components are positioned.

The power supply 140 can include one or more components (e.g., a transformer, a diode bridge, an inverter, a converter) that receives power (for example, through an electrical cable) from the power module 112 of the auto-commissioning device 104 and generates power of a type (e.g., alternating current, direct current) and level (e.g., 12V, 24V, 120V) that can be used by one or more components of the reefer container 102-1. In addition, or in the alternative, the power supply 140 can receive power from a source external to the reefer receptacle 102-1. In addition, or in the alternative, the power supply 140 can be a source of power in itself. For example, the power supply 140 can be a battery, a localized photovoltaic power system, or some other source of independent power.

As stated above, one or more of the reefer receptacles 102 can be placed in any of a number of environments. In such a case, the housing 103 of the reefer receptacle 102-1 can be configured to comply with applicable standards for any of a number of environments. For example, the reefer receptacle 102-1 can be rated as a Division 1 or a Division 2 enclosure under NEC standards. Similarly, any other devices communicably coupled to the reefer receptacle 102-1 can be configured to comply with applicable standards for any of a number of environments.

Figure 2:
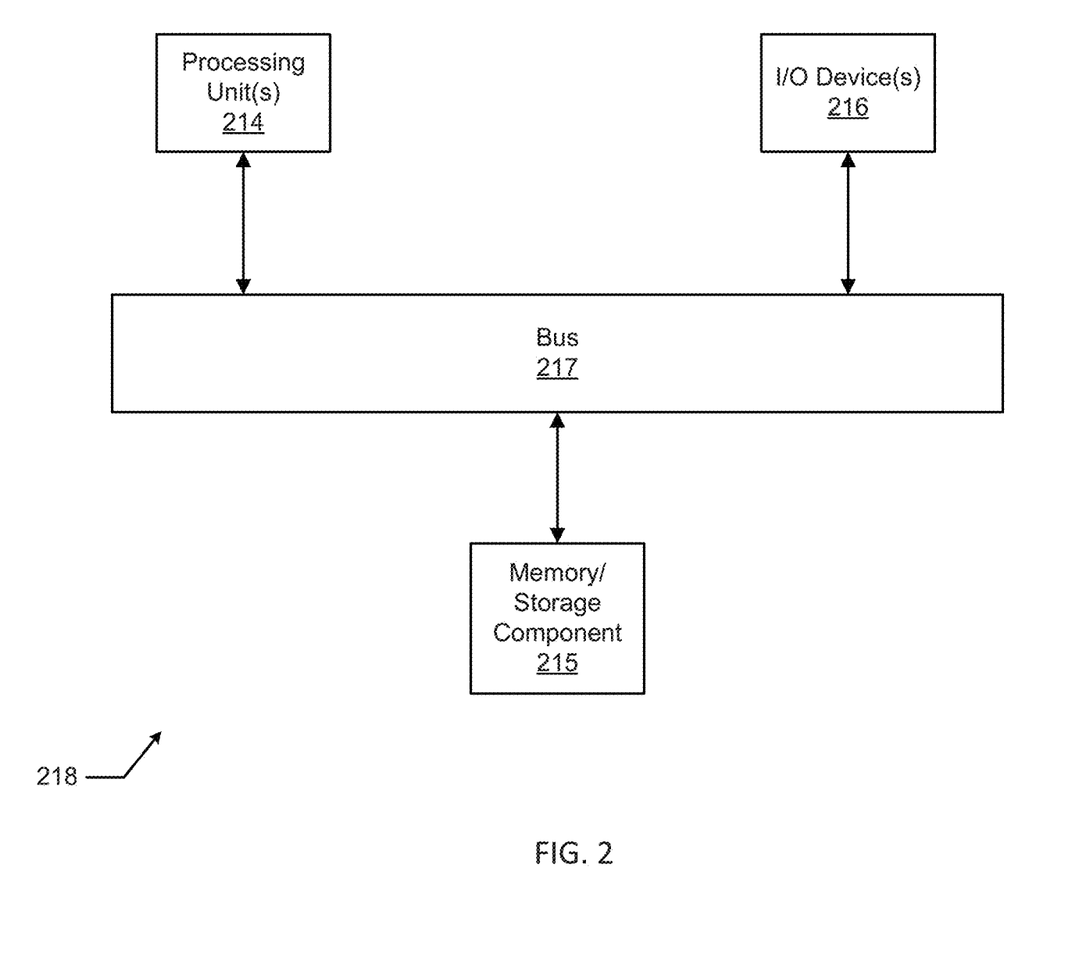
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., auto-commissioning engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
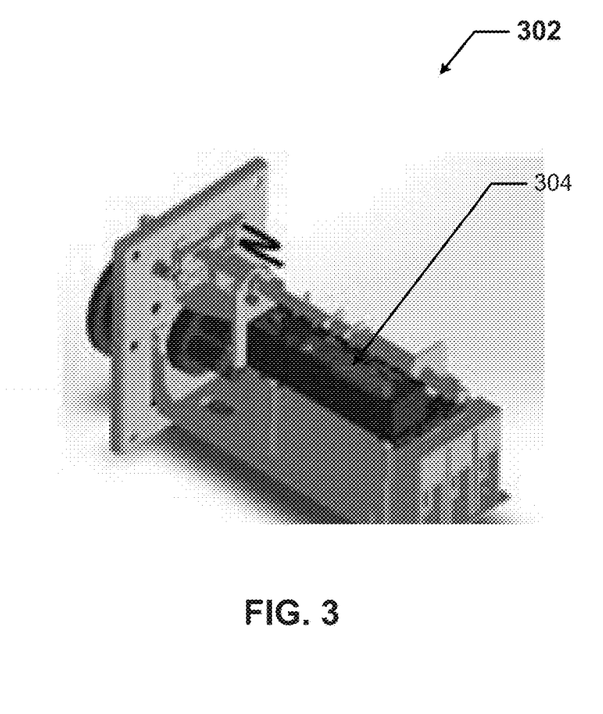
FIG. 3 shows a reefer receptacle in accordance with certain example embodiments.

FIG. 3 shows a reefer receptacle 302 in accordance with certain example embodiments. Referring to FIGS. 1-3, the reefer receptacle 302 is configured to couple to an electrical connector that is part of a reefer container. The power that flows through the reefer receptacle 302 to the reefer container can be used to power one or more components and/or devices (e.g., a refrigeration unit) of the reefer container. In this case, an auto-commissioning device 304 is disposed on an outer surface of the reefer receptacle 302. As stated above, the auto-commissioning device 304 can alternatively be located within the reefer receptacle 302 or physically remote from (but in communication with) the reefer receptacle 302.

Figure 4:
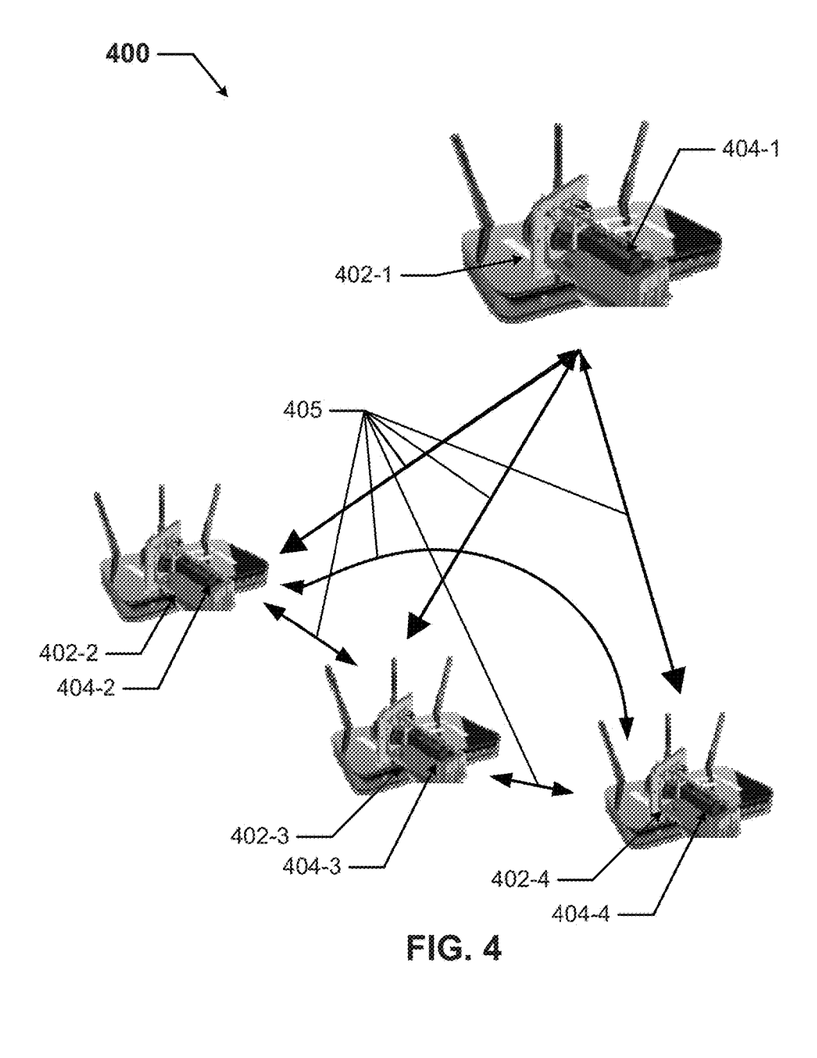
FIG. 4 shows a reefer receptacle communicating with other reefer receptacles in accordance with certain example embodiments.

FIG. 4 shows a portion of a network 400 that includes four reefer receptacles 402 communicating with each other in accordance with certain example embodiments. Referring to FIGS. 1-4, each reefer receptacle 402 of FIG. 4 includes an auto-commissioning device 404. Specifically, reefer receptacle 402-1 includes auto-commissioning device 404-1, reefer receptacle 402-2 includes auto-commissioning device 404-2, reefer receptacle 402-3 includes auto-commissioning device 404-3, and reefer receptacle 402-4 includes auto-commissioning device 404-4. Each auto-commissioning device 404 in this case includes a transceiver that provides wireless communication links 405 using WiFi.

Figure 5:
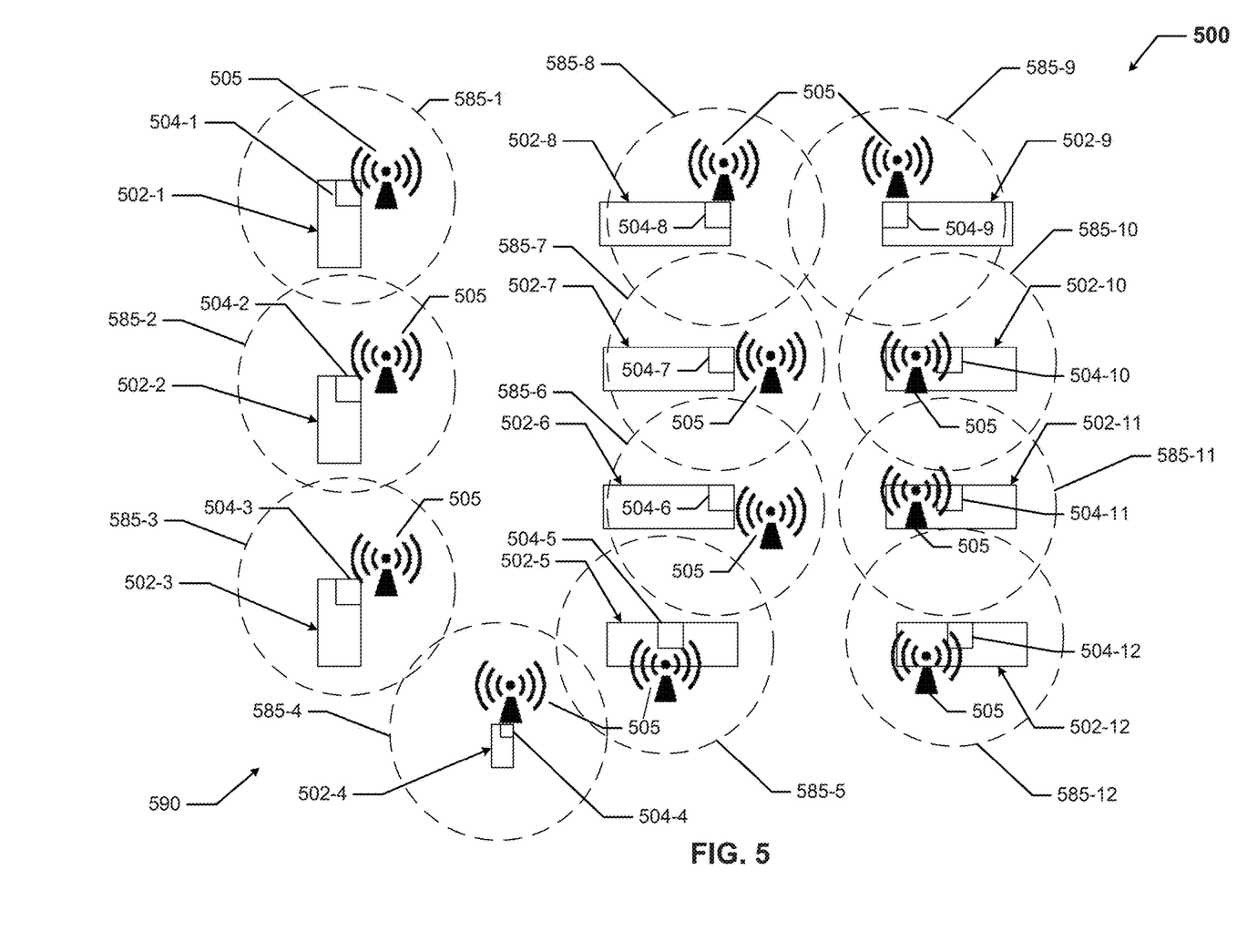
FIG. 5 shows a network of reefer receptacles being auto-commissioned in accordance with certain example embodiments.

FIG. 5 shows a network 500 of reefer receptacles 502 being auto-commissioned in accordance with certain example embodiments. The network 500 can be any application where multiple reefer receptacles 502 are disposed proximate to each other. Examples of the network 500 can include, but are not limited to, a port rack, an on-ship rack, a truck loading area, a rail loading area, and a distribution center.

Referring to FIGS. 1-5, in this case, the network 500 includes twelve reefer receptacles 502. Specifically, the network 500 includes reefer receptacle 502-1, reefer receptacle 502-2, reefer receptacle 502-3, reefer receptacle 502-4, reefer receptacle 502-5, reefer receptacle 502-6, reefer receptacle 502-7, reefer receptacle 502-8, reefer receptacle 502-9, reefer receptacle 502-10, reefer receptacle 502-11, and reefer receptacle 502-12. Not all of the reefer receptacles 502 need to have the same shape and/or size as one or more of the other reefer receptacles in the network 500.

Each reefer receptacle 502 in the network 500 of FIG. 5 includes an auto-commissioning device 504. Specifically, in this example, reefer receptacle 502-1 includes auto-commissioning device 504-1, reefer receptacle 502-2 includes auto-commissioning device 504-2, reefer receptacle 502-3 includes auto-commissioning device 504-3, reefer receptacle 502-4 includes auto-commissioning device 504-4, reefer receptacle 502-5 includes auto-commissioning device 504-5, reefer receptacle 502-6 includes auto-commissioning device 504-6, reefer receptacle 502-7 includes auto-commissioning device 504-7, reefer receptacle 502-8 includes auto-commissioning device 504-8, reefer receptacle 502-9 includes auto-commissioning device 504-9, reefer receptacle 502-10 includes auto-commissioning device 504-10, reefer receptacle 502-11 includes auto-commissioning device 504-11, and reefer receptacle 502-12 includes auto-commissioning device 504-12.

As shown in FIG. 5, the location of the auto-commissioning device 504 on or within the reefer receptacle 502 can vary. Further, each auto-commissioning device 504 includes a transceiver (e.g., transceiver 124), and each transceiver in this example communicates using WiFi. The WiFi provides the communication links 505 by which the reefer receptacles 502 (and, more specifically, the auto-commissioning devices 504 of those reefer receptacles 502) communicate with each other. Each transceiver of an auto-commissioning device 504 has a range 585 (e.g., 10 meters) that defines a maximum area or volume of space in which the transceiver can send and receive signals.

In this case, the transceiver of auto-commissioning device 504-1 has range 585-1, the transceiver of auto-commissioning device 504-2 has range 585-2, the transceiver of auto-commissioning device 504-3 has range 585-3, the transceiver of auto-commissioning device 504-4 has range 585-4, the transceiver of auto-commissioning device 504-5 has range 585-5, the transceiver of auto-commissioning device 504-6 has range 585-6, the transceiver of auto-commissioning device 504-7 has range 585-7, the transceiver of auto-commissioning device 504-8 has range 585-8, the transceiver of auto-commissioning device 504-9 has range 585-9, the transceiver of auto-commissioning device 504-10 has range 585-10, the transceiver of auto-commissioning device 504-11 has range 585-11, and the transceiver of auto-commissioning device 504-12 has range 585-12.

A transceiver of an auto-commissioning device 504 of a reefer receptacle 502 can directly communicate with a transceiver of an auto-commissioning device 504 of another reefer receptacle 502 if the range 585 of one transceiver intersects with the range 585 of another transceiver. In this example, range 585-1 intersects range 585-2, and so auto-commissioning device 504-1 and auto-commissioning device 504-2 can communicate directly with each other. In addition, range 585-2 intersects range 585-3, and so auto-commissioning device 504-2 and auto-commissioning device 504-3 can communicate directly with each other.

In addition, range 585-3 intersects range 585-4, and so auto-commissioning device 504-3 and auto-commissioning device 504-4 can communicate directly with each other. In addition, range 585-4 intersects range 585-5, and so auto-commissioning device 504-4 and auto-commissioning device 504-5 can communicate directly with each other. In addition, range 585-5 intersects range 585-6, and so auto-commissioning device 504-5 and auto-commissioning device 504-6 can communicate directly with each other.

In addition, range 585-6 intersects range 585-7, and so auto-commissioning device 504-6 and auto-commissioning device 504-7 can communicate directly with each other. In addition, range 585-7 intersects range 585-8, and so auto-commissioning device 504-7 and auto-commissioning device 504-8 can communicate directly with each other. In addition, range 585-8 intersects range 585-9, and so auto-commissioning device 504-8 and auto-commissioning device 504-9 can communicate directly with each other.

In addition, range 585-9 intersects range 585-10, and so auto-commissioning device 504-9 and auto-commissioning device 504-10 can communicate directly with each other. In addition, range 585-10 intersects range 585-11, and so auto-commissioning device 504-10 and auto-commissioning device 504-11 can communicate directly with each other. In addition, range 585-11 intersects range 585-12, and so auto-commissioning device 504-11 and auto-commissioning device 504-12 can communicate directly with each other.

In other words, the auto-commissioning devices 504 of the reefer receptacles 502 of FIG. 5 are communicably coupled to each other in a daisy-chain configuration. In other embodiments, such as with the network 400 of FIG. 4, the range 585 of the transceiver of the auto-commissioning device 504 of one reefer receptacle 502 can intersect with more than two ranges 585 of the transceivers of the auto-commissioning devices 504 of one or more other reefer receptacle 502. For example, if the range 585-6 of the transceiver for auto-commissioning device 504-6 was twice as large as what is shown in FIG. 5, then auto-commissioning device 504-6 could communicate directly with auto-commissioning device 504-4, auto-commissioning device 504-8, auto-commissioning device 504-10, auto-commissioning device 504-11, and auto-commissioning device 504-12, in addition to auto-commissioning device 504-5 and auto-commissioning device 504-7.

The reefer receptacles 502 of the network 500 of FIG. 5 are located within a volume of space 590. A volume of space can be any interior and/or exterior space in which one or more reefer receptacles 502 can be located. Examples of a volume of space 590 can include, but are not limited to, a shipping port, a warehouse, a distribution center, a loading dock, a railway loading station, and a trucking dispatch center. The communication links 505 can be capable of having a range 585 that extend beyond a wall, a device, a panel, an electrical enclosure, and/or any other object within the volume of space 590.

The example auto-commissioning devices 504 of FIG. 5 can commission the reefer receptacles 502 of the network 500 in one or more of a number of ways. For example, when each of the reefer receptacles 502 initially receives power, before being put into service, the auto-commissioning device 504 of each of the reefer receptacles 502 can publish (send a signal using the communication link 505) an access point that includes a unique identification number (part of the stored data 134) for that reefer receptacle 502.

In certain example embodiments, at least one of the reefer receptacles 502 has already been commissioned by a user (e.g., user 150). When power is initially provided to all reefer receptacles 502, the example auto-commissioning device 504 of each reefer receptacle 502 can broadcast the access point, along with its unique identification number, over the communication links 505 (e.g., WiFi).

An example of a signal sent by an auto-commissioning device 504 is "Eaton_ERR_1A3F5C8D00", where "1A3F5C8D00" can be the media access control (MAC) address of the reefer receptacle 502, and "Eaton_ERR" can be a service set identifier (SSID) common to all reefer receptacles 502 in the network 500. When an auto-commissioning device 504 of a reefer receptacle 502 transmits its signal, using the communication links 505, the auto-commissioning device 504 awaits a connection to the access point with the auto-commissioning device 504 of another reefer receptacle 502 in the network 500.

When the auto-commissioning device 504 (e.g., auto-commissioning device 504-3) of another reefer receptacle 502 (e.g., reefer receptacle 502-3) connects to the access point of the auto-commissioning device 504 (e.g., auto-commissioning device 504-4) of reefer receptacle 502 (e.g., reefer receptacle 502-4), the auto-commissioning device 504 (e.g., auto-commissioning device 504-3) of the initiating reefer receptacle 502 (e.g., reefer receptacle 502-3) completes a "digital form" (e.g., using stored data 134) that, once completed, commissions the reefer receptacle 502 (e.g., reefer receptacle 502-4). Once the auto-commissioning device 504 of the initiating reefer receptacle 502 accepts the commissioning parameters, the auto-commissioning device 504 can tear down its access point.

At this point, the auto-commissioning device 504 (in this example, auto-commissioning device 504-4) of the now-commissioned reefer receptacle 502 (in this example, reefer receptacle 502-4) can use the communication links 505 to identify the identification numbers, through their access points, of other reefer receptacles 502 (e.g., reefer receptacle 502-5) in the network 500 that have not yet been commissioned. If such a reefer receptacle 502 (e.g., reefer receptacle 502-5) is found, the auto-commissioning device 504 (e.g., auto-commissioning device 504-4) of the now-commissioned reefer receptacle 502 (e.g., reefer receptacle 502-4) can send the "digital form" (i.e., the commissioning parameters) to the auto-commissioning device 504 (e.g., auto-commissioning device 504-5) of that reefer receptacle 502

(e.g., reefer receptacle 502-5) so that the reefer receptacle 502 (e.g., reefer receptacle 502-5) can be commissioned.

This process can continue until all reefer receptacles 502 in the network 500 have been commissioned after receiving the commissioning parameters. For example, when no other access points, aside from the access point of the first-commissioned reefer receptacle 502 (or most recently commissioned reefer receptacle 502 or some other designated reefer receptacle 502 that has been commissioned), are active, then all reefer receptacles 502 in the network 500 have been commissioned. In such a case, the access point of the first-commissioned reefer receptacle 502 (or most recently commissioned reefer receptacle 502 or some other designated reefer receptacle 502 that has been commissioned) can be torn down, and the communication links 505 can be used to notify a user, a network manager, and/or some other suitable entity that all reefer receptacles 502 in the network 500 have been commissioned. In addition, other information (e.g., serial numbers, performance test results, voltage data) associated with one or more reefer receptacles 502 can also be reported. In this way, example auto-commissioning devices 504 can be used to determine when maintenance and/or replacement of a reefer receptacle 502 is required while the reefer receptacle 502 is in service.

In certain example embodiments, when the auto-commissioning process is complete, example auto-commissioning devices 504 can be used to monitor (e.g., measure current, measure voltage) the reefer receptacles 502 while the reefer receptacles 502 are in service. In some cases, when the auto-commissioning process is complete, one or more of the auto-commissioning devices 504 can go into "sleep" mode or completely shut down. In some cases, the procedure for auto-commissioning the network 500 of reefer receptacles 502 in the volume of space 590 can be re-run based on some factor (e.g., passage of time, instructions from a user, replacement of one or more reefer receptacles 502, addition of one or more new reefer receptacles 502 in the network 500).

For example, if one or more new reefer receptacles 502 are added a year after the network 500 of FIG. 5 is auto commissioned using example embodiments, then the new reefer receptacles 502 can be automatically commissioned using example embodiments. Similarly, if a reefer receptacle 502 is replaced with a new replacement reefer receptacle 502, then the replacement reefer receptacle 502 can be automatically commissioned using example embodiments.

The commissioning parameters that are broadcast by a reefer receptacle 502 can be identical for all reefer receptacles 502 in the network 500. In such a case, the all of the reefer receptacles 502 in the network 502 can be substantially the same (e.g., same manufacturer, same model, same voltage rating) as each other. Alternatively, the commissioning parameters can be multiple different commissioning parameters that are each specific to one or a group of similar reefer receptacles 502 in the network 500.

As discussed above, the process of commissioning the network 500 of reefer receptacles 502 can be executed in one or more of a number of ways. For instance, one reefer receptacle 502 can be tasked with commissioning all of the other reefer receptacles 502 in the network 500. As a specific example, reefer receptacle 502-1 receives power and enters into access point mode. At that point, a user 150 can load, through the transceiver (e.g., wirelessly, wired) of the auto-commissioning device 504-1, the commissioning parameters to the auto-commissioning device 504-1 of reefer receptacle 502-1. Once the auto-commissioning device 504-1 of reefer receptacle 502-1 has received the commissioning parameters, then the auto-commissioning device 504-1 exits access point mode and enters into commissioning mode.

Once all of the other reefer receptacles 502 (reefer receptacle 502-2 through reefer receptacle 502-12) in the network 500 receive power, those other reefer receptacles 502 enter into access point mode and begin to broadcast communications, where each such communication can include the SSID of the network 500 and the MAC address (identification) of the associated reefer receptacle 502. At the same time, while reefer receptacle 502-1 is in commissioning mode, the auto-commissioning device 504-1 of reefer receptacle 502-1 is searching for the communications sent by the other reefer receptacles 502 in the network 500.

For reefer receptacle 502-2, whose range 585-2 overlaps with the range 585-1 of reefer receptacle 502-1, the communication (which includes the identification of reefer receptacle 502-2) broadcast by reefer receptacle 502-2 is received directly by the transceiver of reefer receptacle 502-1. Upon receiving this communication from reefer receptacle 502-2, the auto-commissioning device 504-1 of reefer receptacle 502-1 identifies the sender (reefer receptacle 502-2) and generates a reply communication that includes the identification of reefer receptacle 502-2 and the commissioning parameters. The reefer receptacle 502-1 then broadcasts this reply communication, which is received directly by the transceiver of reefer receptacle 502-2. Upon receiving the reply communication directly from reefer receptacle 502-1, the auto-commissioning device 504-2 of reefer receptacle 502-2 commissions the reefer receptacle 502-2 using the commissioning parameters. Once reefer receptacle 502-2 has completed the commissioning process, the reefer receptacle 502-2 exits access point mode and enters into normal operating mode.

Since all of the other reefer receptacles 502 (reefer receptacle 502-3 through reefer receptacle 502-12) in the network 500 do not have ranges 585 that directly overlap with the range 585-1 of reefer receptacle 502-1, one or more intermediate reefer receptacles 502 must be used to commission reefer receptacle 502-3 through reefer receptacle 502-12. For example, for reefer receptacle 502-5, the communication (which includes the identification of reefer receptacle 502-5) broadcast by reefer receptacle 502-5 is received directly by the transceiver of reefer receptacle 502-4. Reefer receptacle 502-4, realizing that the communication broadcast by reefer receptacle 502-5 is not addressed to it, relays the same communication to reefer receptacle 502-3, which in turn relays the same communication to reefer receptacle 502-2, which in turn relays the same communication to reefer receptacle 502-1.

Upon receiving this communication from reefer receptacle 502-5 (via reefer receptacles 502-2 through reefer receptacle 502-4), the auto-commissioning device 504-1 of reefer receptacle 502-1 identifies the sender (reefer receptacle 502-5) and generates a reply communication that includes the identification of reefer receptacle 502-5 and the commissioning parameters. The reefer receptacle 502-1 then broadcasts this reply communication, which is received directly by reefer receptacle 502-2. Reefer receptacle 502-2, realizing that the reply communication broadcast by reefer receptacle 502-1 is not addressed to it, relays the same reply communication to reefer receptacle 502-3, which in turn relays the same reply communication to reefer receptacle 502-4, which in turn relays the same reply communication to reefer receptacle 502-5.

Upon receiving the reply communication from reefer receptacle 502-1 (via reefer receptacles 502-2 through reefer receptacle 502-4), the auto-commissioning device 504-5 of reefer receptacle 502-5 commissions the reefer receptacle 502-5 using the commissioning parameters. Once reefer receptacle 502-5 has completed the commissioning process, the reefer receptacle 502-5 exits access point mode and enters into normal operating mode. Reefer receptacle 502-3, reefer receptacle 502-4, and reefer receptacle 502-6 through reefer receptacle 502-12 go through a similar process to become commissioned.

Once reefer receptacle 502-1 no longer receives any communications from the rest of the reefer receptacles 502 in the network 500, reefer receptacle 502-1 assumes that the rest of the reefer receptacles 502 in the network 500 are commissioned. At that point, the reefer receptacle 502-1 exits commissioning mode and enters normal operating mode.

In some cases, multiple reefer receptacle 502 can be tasked with commissioning one or more of the other reefer receptacles 502 in the network 500. As a specific example, reefer receptacle 502-12 receives power and enters into access point mode. At that point, a user 150 can load, through the transceiver (e.g., wirelessly, wired) of the auto-commissioning device 504-12, the commissioning parameters to the auto-commissioning device 504-12 of reefer receptacle 502-12. Once the auto-commissioning device 504-12 of reefer receptacle 502-12 has received the commissioning parameters, then the auto-commissioning device 504-12 exits access point mode and enters into commissioning mode.

Once all of the other reefer receptacles 502 (reefer receptacle 502-1 through reefer receptacle 502-11) in the network 500 receive power, those other reefer receptacles 502 enter into access point mode and begin to broadcast communications, where each such communication can include the SSID of the network 500 and the MAC address (identification) of the associated reefer receptacle 502. At the same time, while reefer receptacle 502-12 is in commissioning mode, the auto-commissioning device 504-12 of reefer receptacle 502-12 is searching for direct communications sent by the other reefer receptacles 502 in the network 500.

For reefer receptacle 502-11, whose range 585-11 overlaps with the range 585-12 of reefer receptacle 502-12, the communication (which includes the identification of reefer receptacle 502-11) broadcast by reefer receptacle 502-11 is received directly by the transceiver of reefer receptacle 502-12. Upon receiving this communication from reefer receptacle 502-11, the auto-commissioning device 504-12 of reefer receptacle 502-12 identifies the sender (reefer receptacle 502-11) and generates a reply communication that includes the identification of reefer receptacle 502-11 and the commissioning parameters. As discussed above, the commissioning parameters can be the same as, or different than, the commissioning parameters used to commission reefer receptacle 502-12. The reefer receptacle 502-12 then broadcasts this reply communication, which is received directly by the transceiver of reefer receptacle 502-11.

Upon receiving the reply communication directly from reefer receptacle 502-12, the auto-commissioning device 504-11 of reefer receptacle 502-11 commissions the reefer receptacle 502-11 using the commissioning parameters. Once reefer receptacle 502-11 has completed the commissioning process, the reefer receptacle 502-11 exits access point mode and enters into commissioning mode. Further, when the auto-commissioning device 504-12 of reefer receptacle 502-12 determines that there are no other direct communication sources (reefer receptacles) in access point mode broadcasting communications seeking to be commissioned, then reefer receptacle 502-12 exits commissioning mode and enters into normal operating mode.

While in commissioning mode, reefer receptacle 502-11 searches for direct communications broadcast by the other reefer receptacles 502 in the network 500. As shown in FIG. 5, the range 585-11 of reefer receptacle 502-11 overlaps with the range 585-10 of reefer receptacle 502-10 and the range 585-12 of reefer receptacle 502-12. Since reefer receptacle 502-12 is already commissioned and is in normal operating mode, reefer receptacle 502-12 is no longer broadcasting its communication seeking to be commissioned. However, reefer receptacle 502-10 is broadcasting its communication (which includes the identification of reefer receptacle 502-10) seeking to be commissioned, and this communication is received directly by the transceiver of reefer receptacle 502-11.

Upon receiving this communication from reefer receptacle 502-10, the auto-commissioning device 504-11 of reefer receptacle 502-11 identifies the sender (reefer receptacle 502-10) and generates a reply communication that includes the identification of reefer receptacle 502-10 and the commissioning parameters. As discussed above, the commissioning parameters can be the same as, or different than, the commissioning parameters used to commission reefer receptacle 502-11 and/or reefer receptacle 502-12. The reefer receptacle 502-11 then broadcasts this reply communication, which is received directly by the transceiver of reefer receptacle 502-10.

Upon receiving the reply communication directly from reefer receptacle 502-11, the auto-commissioning device 504-10 of reefer receptacle 502-10 commissions the reefer receptacle 502-10 using the commissioning parameters. Once reefer receptacle 502-10 has completed the commissioning process, the reefer receptacle 502-10 exits access point mode and enters into commissioning mode. Further, when the auto-commissioning device 504-11 of reefer receptacle 502-11 determines that there are no other direct communication sources (reefer receptacles) in access point mode broadcasting communications seeking to be commissioned, then reefer receptacle 502-11 exits commissioning mode and enters into normal operating mode.

Reefer receptacles 502-9 through reefer receptacle 502-1 (in that order) go through a similar process to become commissioned. At the end of the commissioning process, when the auto-commissioning device 504-1 of reefer receptacle 502-1 determines that there are no other direct communication sources (reefer receptacles) in access point mode broadcasting communications seeking to be commissioned, then reefer receptacle 502-1 exits commissioning mode and enters into normal operating mode.

Example embodiments can be used to automatically commission a network of reefer receptacles in a volume of space. Further, example embodiments can be used to automatically commission any new or replacement reefer receptacles in the volume of space over time. Example embodiments can also be used to perform audit functions (e.g., measure current or voltage, determine failures), whether during commissioning or in normal operation. Example embodiments can save time and resources while efficiently and automatically commissioning reefer receptacles in a volume of space.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An electrical device of a network of electrical devices, comprising:
   an electrical receptacle configured to couple to a complementary electrical connector; and
   an auto-commissioning device comprising a transceiver and an auto-commissioning engine, wherein the transceiver communicates with an adjacent transceiver of an adjacent electrical device when the electrical receptacle is coupled to the complementary electrical connector, wherein the auto-commissioning engine, based on communication between the transceiver and the adjacent transceiver, identifies and commissions the electrical device and the adjacent electrical device while the electrical receptacle is coupled to the complementary electrical connector, wherein the auto-commissioning device is embedded in a coupling between the electrical receptacle and the complementary electrical connector.

2. The electrical device of claim 1, wherein the auto-commissioning engine further determines whether the adjacent electrical device is operating properly.

3. The electrical device of claim 2, wherein the auto-commissioning engine sends an operational status of the adjacent electrical device to a user.

4. The electrical device of claim 2, wherein the transceiver wirelessly communicates with the adjacent transceiver.

5. The electrical device of claim 4, wherein the transceiver uses WiFi.

6. The electrical device of claim 5, wherein the auto-commissioning engine determines a frequency used by the transceiver.

7. The electrical device of claim 4, wherein the transceiver and the adjacent transceiver are within a range of each other.

8. The electrical device of claim 4, wherein the transceiver and the adjacent transceiver are outside of a range of each other, wherein at least one intermediary transceiver of at least one intermediary electrical device provides a bridge between the transceiver and the adjacent transceiver.

9. The electrical device of claim 8, wherein the auto-commissioning engine operates using a hardware processor.

10. The electrical device of claim 1, wherein the network of electrical devices comprises a network of reefer receptacles.

11. A method for commissioning a plurality of electrical devices, the method comprising:
    receiving commissioning parameters;
    receiving a first communication from a first commissioning system of a first electrical device, wherein the first communication comprises a first identification of the first electrical device, wherein the first electrical device comprises a first electrical receptacle that is coupled to a first complementary electrical connector, wherein the first commissioning system is embedded in the first electrical receptacle, and wherein the first electrical device is in a first mode; and
    sending, in response to the first communication, a first reply communication to the first electrical device, wherein the first reply communication comprises the first identification of the first electrical device and the commissioning parameters,
    wherein the first electrical device is commissioned according to the commissioning parameters,
    wherein the first electrical device exits the first mode and enters a second mode after processing the first reply communication.

12. The method of claim 11, wherein the commissioning parameters are received from a user.

13. The method of claim 11, wherein the commissioning parameters are received from another electrical device.

14. The method of claim 11, further comprising:
    receiving a second communication from a second electrical device, wherein the second communication comprises a second identification of the second electrical device, and wherein the second electrical device is in the first mode; and
    sending, in response to the second communication, a second reply communication to the second electrical device, wherein the second reply communication comprises the second identification of the second electrical device and the commissioning parameters,
    wherein the second electrical device is commissioned according to the commissioning parameters,
    wherein the second electrical device exits the first mode and enters the second mode after processing the second reply communication.

15. The method of claim 11, wherein the communications with the plurality of electrical devices are made while in the first mode, wherein the second mode is entered when the plurality of electrical devices are commissioned.

16. The method of claim 11, wherein the first mode is an access point mode, and wherein the second mode is a normal operating mode.

* * * * *